UNITED STATES PATENT OFFICE.

CLARENCE A. WARD, OF BROOKLYN, NEW YORK.

PAINT AND PROCESS OF MAKING SAME.

1,421,625.  Specification of Letters Patent.  Patented July 4, 1922.

No Drawing.  Application filed February 11, 1920. Serial No. 357,892.

*To all whom it may concern:*

Be it known that CLARENCE A. WARD, citizen of the United States, residing at Brooklyn, in the county of Kings and State of New York, has invented certain new and useful Improvements in Paints and Processes of Making Same, of which the following is a specification.

The present invention relates to paints or the like wherein an insoluble pigment is suspended in an oily or other suitable vehicle.

In the ordinary method of manufacturing paints the pigment is prepared in a fine state of subdivision and is then mixed and ground with the varying proportions of oil, the grinding with oil being conducted in order to produce a more intimate and uniform mixture. It is customary in some cases to use such proportions of vehicle as will produce a paste which is subsequently thinned with additional vehicle to produce a liquid paint. In other cases sufficient vehicle is used in the first grinding to produce the substantially finished product—liquid paint.

It is a well known fact that if paint in the container is allowed to stand for any great length of time the solid material will settle to the bottom of the container and produce a very thick mass which is difficult to again suspend uniformly in the vehicle. This settling is particularly objectionable in ready-mixed paints in packages for retail trade.

It is among the objects of the present invention to produce a paint which is stable against such settling; and to provide a simple, cheap and easily performed method of producing such paint.

These objects are very readily attained by adding to the paint in the process of manufacture and in suitable fashion, a material which acts to greatly retard the settling, so that a paint so prepared and which has stood for a considerable length of time, will be found still in condition for immediate use.

Materials which will accomplish this desirable purpose are certain metallic and alkaline earth compounds or soaps of linoleic, stearic, palmitic and other organic acids.

The action of these materials in producing the results stated is not clearly understood and no attempt will be made here to set out the theory of their action. It will merely be stated that the addition of these materials in quantities up to about five per cent depending upon the particular paint, in the manner, or substantially the manner, herein described, to a paint will materially retard, if not entirely prevent, the settling out of the pigment.

The addition of these materials is preferably accomplished by introducing with the pigment and oil in the grinding operation from about 1 per cent to about 5 per cent of the total dry pigment of one or more of the compounds or soaps mentioned. The grinding is carried out in the usual manner. Particularly good results have been obtained by the use of aluminum and zinc stearates, it being preferred to use these in combination to be understood that the other soaps of these metals may be used although ordinarily not so desirable, also compounds of the alkaline earth group with such acid components as the acid radicals of oleic acid and those above mentioned, the essential qualities being substantial insolubility in water and in cold vegetable oils and low specific gravity.

Having now described my invention and the preferred form of practicing the same, it is to be understood that it is to be limited not to the specific proportions and materials herein set out, but only by the terms of the appended claims.

I claim:

1. A process of producing paint which comprises grinding together a suitable vehicle, a pigment and aluminum and zinc stearates.

2. A process of producing paint which comprises grinding together a suitable vehicle, a pigment and 1 to 5 per cent of aluminum and zinc stearates, based upon the proportion of dry pigment.

3. A paint comprising a vehicle, a pigment and a mixture of aluminum and zinc stearates intimately mixed with said pigment and suspended in the vehicle.

4. A paint comprising a vehicle, a pigment and 1 to 5 per cent of aluminum and zinc stearates intimately mixed with said pigment and suspended in the vehicle.

In testimony whereof I affix my signature.

CLARENCE A. WARD.